US006741052B2

(12) United States Patent
Fitzgibbon

(10) Patent No.: US 6,741,052 B2
(45) Date of Patent: May 25, 2004

(54) POST-AUTOMATICALLY DETERMINED USER-MODIFIABLE ACTIVITY PERFORMANCE LIMIT APPARATUS AND METHOD

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/120,756

(22) Filed: Apr. 11, 2002

(65) Prior Publication Data

US 2003/0193304 A1 Oct. 16, 2003

(51) Int. Cl.[7] ................................................ H02P 7/00

(52) U.S. Cl. ...................... 318/434; 318/280; 318/282; 318/286; 318/266; 318/590; 318/591; 49/26; 49/28

(58) Field of Search ................................ 318/434, 266, 318/280, 282, 286, 590, 591; 49/26, 28

(56) References Cited

U.S. PATENT DOCUMENTS

| | | | | | |
|---|---|---|---|---|---|
| 5,278,480 | A | * | 1/1994 | Murray | 318/626 |
| 5,399,950 | A | * | 3/1995 | Lu et al. | 318/565 |
| 5,539,290 | A | * | 7/1996 | Lu et al. | 318/565 |
| 6,025,785 | A | * | 2/2000 | Farris et al. | 340/5.23 |
| 6,107,765 | A | | 8/2000 | Fitzgibbon et al. | 318/266 |
| 6,111,374 | A | | 8/2000 | Fitzgibbon et al. | 318/282 |
| 6,118,243 | A | * | 9/2000 | Reed et al. | 318/468 |
| 6,133,703 | A | | 10/2000 | Fitzgibbon et al. | 318/445 |
| 6,161,438 | A | * | 12/2000 | Mullet et al. | 73/774 |
| 6,172,475 | B1 | | 1/2001 | Fitzgibbon et al. | 318/266 |
| 6,326,751 | B1 | * | 12/2001 | Mullet et al. | 318/434 |
| 6,400,112 | B1 | | 6/2002 | Fitzgibbon et al. | 318/445 |
| 6,456,022 | B1 | * | 9/2002 | Fitzgibbon et al. | 318/162 |
| 6,605,910 | B2 | * | 8/2003 | Mullet et al. | 318/264 |
| 2003/0062865 | A1 | * | 9/2001 | Mullet et al. | |

* cited by examiner

*Primary Examiner*—Rita Leykin
(74) *Attorney, Agent, or Firm*—Fitch, Even, Tabin & Flannery

(57) ABSTRACT

In a control system (10) having a learning mode (20) such that performance limits can be automatically determined for subsequent use during normal operating modes (40), one or more user manipulable controls (18) are provided to allow a user to selectively adjust the previously automatically determined performance limits. In one embodiment the range of adjustment can be limited. The user control (18) can be located in various positions with respect to the control unit (15). In an exemplary embodiment, the control system (10) comprises a movable barrier operating system such as a garage door opener.

35 Claims, 3 Drawing Sheets

POST-AUTOMATICALLY DETERMINED USER-MODIFIABLE ACTIVITY PERFORMANCE LIMIT APPARATUS AND METHOD

TECHNICAL FIELD

This invention relates generally to control systems and more particularly to movable barrier control systems.

BACKGROUND

Many control systems are known in the art, including control systems for use with movable barriers such as, for example, garage doors. Many such control systems must be calibrated to a given installed setting in order to better accommodate physical influences that can vary from installation to installation. Some control systems provide a human interface to allow an operator to make the appropriate calibration settings. Other systems utilize sensors and/or processing capability to automatically sense the relevant physical influences and then use such information to automatically calibrate the control system to the particular setting.

Automatic calibration can greatly facilitate ease of installation and operation, contributing to cost effective efficiency, efficacy, and safety. Unfortunately, at least for some applications (such as, for example, moveable barrier operators), automatic calibration often does not provide the calibration most suited to a particular setting. Furthermore, even if properly calibrated in the first instance, the appropriate calibration settings may change over time as the physical conditions change (due to, for example, friction and wear, age, temperature, maintenance, temporary (or permanent) physical impingements, and so forth).

BRIEF DESCRIPTION OF THE DRAWINGS

The above needs are at least partially met through provision of the post-automatically determined user-modifiable activity performance limit apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, many common elements that are not important to an understanding of the invention are not shown for purposes of clarity.

DETAILED DESCRIPTION

Generally speaking, pursuant to these various embodiments, at least one performance limit that corresponds to a particular activity is automatically determined. A human interface is then provided to allow a subsequent post-determination non-automatic adjustment to be made to the automatically determined performance limit by a user. That automatically determined performance limit as subsequently adjusted is then used when later facilitating the particular activity. To provide a more specific illustrative example of the above, the particular activity can be controlled movement of a movable barrier, such as a garage door, by a motor that is itself controlled by a barrier movement control unit. During a learning mode of operation, one or more force thresholds are automatically determined by the barrier movement control unit. A user manipulable force threshold modification control allows a user to adjust the automatically determined force thresholds, which adjusted thresholds are then subsequently used by the barrier movement control unit during a normal mode of operation when moving the barrier.

So configured, the benefits of automatically calibrating the control unit are realized with all of the usual attendant benefits of safety, efficacy, and efficiency. At the same time, a simple relatively intuitive mechanism is provided to allow a user to compensate for physical circumstances that the automatic calibration process cannot otherwise capture (both during initial installation and subsequently). In one embodiment, to prevent a user from inappropriately adjusting the automatically determined calibration value too far, the range of adjustment for the adjustment mechanism is limited. This aids in assuring that the benefits of automatic calibration, including safety benefits, are not defeated by the post-determination adjustment opportunity.

Figure 1:
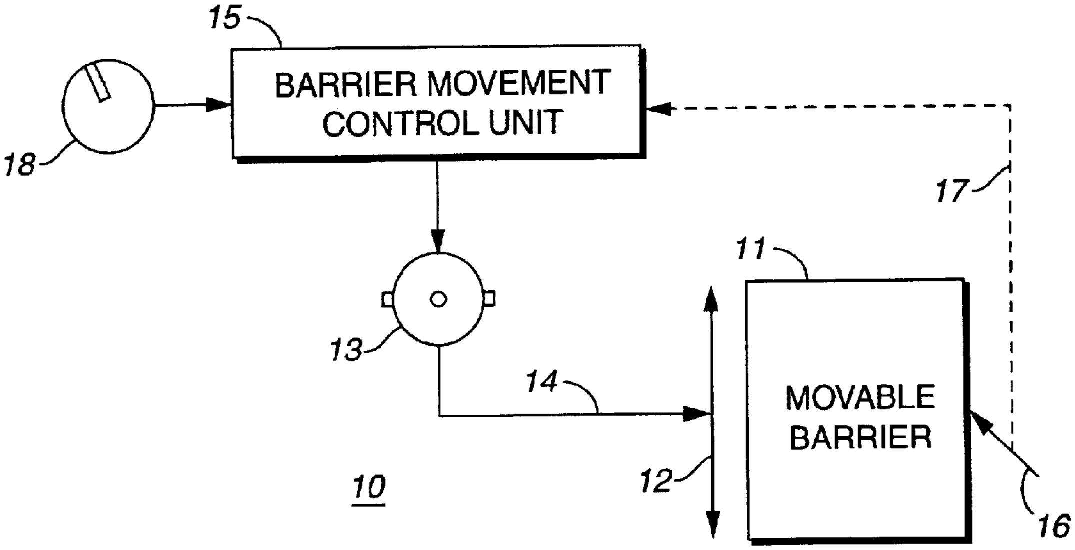
FIG. 1 comprises a block diagram depiction of a control unit embodiment configured in accordance with the invention.

Referring now to the drawings, and particularly to FIG. 1, various embodiments of a barrier movement control system 10 for use with a movable barrier 11 will be presented to further illustrate these and other inventive concepts. The movable barrier 11 itself can be, for example, a garage door. Such garage doors usually move vertically 12 between opened and closed positions and the examples presented below are based upon such a configuration. It should be understood, though, that these teachings are equally applicable to other activities, including but not limited to horizontally-moving and pivoting movable barriers. A motor 13, coupled to the movable barrier 11 by a drive apparatus 14 in accordance with well understood prior art technique, effects desired movement of the movable barrier 11 (the drive apparatus 14 can be, for example, a chain or screw driven mechanism or any other drive mechanism as may be appropriate to a given application).

A barrier movement control unit 15 controls operation of the motor 13. Such a control unit 15 typically includes a processor that constitutes a programmable platform that can be suitably programmed to function in accordance with the embodiments presented herein. In the alternative, additional processing capability and/or dedicated circuitry can be added to known controllers to achieve the desired operability. The barrier movement control unit 15 includes an input, in this embodiment, for receiving data 17 that reflects sensed forces 16 acting in opposition to powered movement of the movable barrier 11. Various sensors, including magnetic and optically based sensors, exist to facilitate such sensing and the application of such sensors for these purposes is also well understood in the art. Therefore, additional details will not be presented here for the sake of clarity and brevity. The barrier movement control unit 15 also couples to a user manipulable force threshold modification control 18. This user control 18 can be, for example, a potentiometer as well understood in the art or, if desired, any other analog or digital input mechanism, including but not limited to DIP switches, analog-to-digital switch interfaces, touch screens, cursor controls, voice actuated mechanisms, and so forth.

Such a control system 10 will also usually have wall mounted switches and/or remote control switches to allow a user to use the control system 10 to control operation of the barrier 11. Such controls are not shown as they are not especially relevant to the concepts being presented. Similarly, the barrier movement control unit 15 will itself often include other elements, including a radio receiver or transceiver, which elements are again not illustrated for purposes of clarity and brevity.

Figure 2:
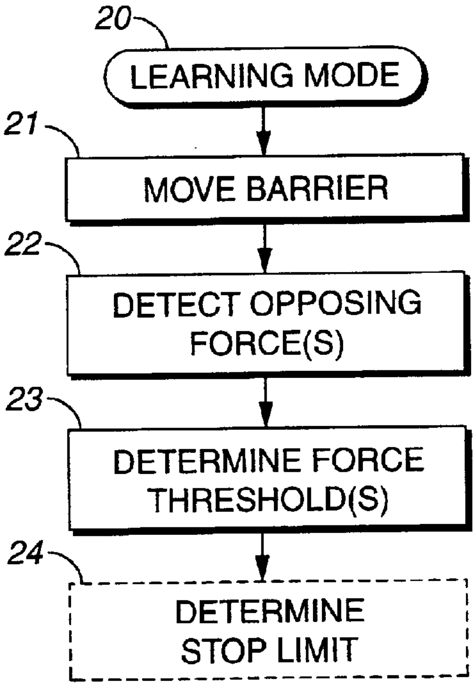
FIG. 2 (PRIOR ART)
FIG. 2 comprises a flow diagram of a learning mode embodiment configured in accordance with prior art practice.

So configured, such a control system 10 can effect a variety of activities including, pertinent to these teachings, a learning mode and a normal operational mode. The learning mode can be an ordinary prior art approach. Since understanding the learning mode can aid in an understanding of these embodiments, at least parts of an exemplary learning mode 20 will be briefly described with respect to FIG. 2. During the learning mode 20, the barrier movement control unit 15 moves 21 the movable barrier 11, typically from a first position to a second position (for example, from a closed position to an open position). While moving the movable barrier 11, the barrier movement control unit 15 detects 22 forces that work in opposition to the movement of the movable barrier 11. This force (or these forces) are quantified and the results are then used to determine 23 one or more force thresholds for subsequent use during normal operations.

Figure 3:
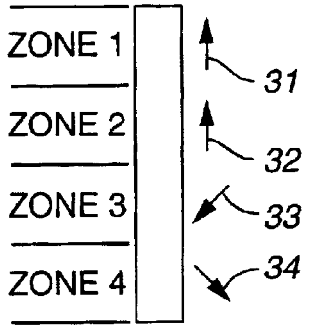
FIG. 3 comprises an illustrative depiction of zones of travel and corresponding oppositional forces.

Referring momentarily to FIG. 3, if desired, a plurality of force thresholds can be determined, wherein each force threshold corresponds to a particular zone that the movable barrier 11 traverses during controlled movement. Four such zones are shown for purposes of clarity, though usually more zones than this will be defined for a given garage door setting. As the movable barrier 11 moves through each zone, different forces can and will typically act upon the barrier 11 in full or partial opposition to the intended direction of movement and/or in correspondence with the intended direction of movement. As depicted in FIG. 3, each of the four zones has a corresponding external force 31–34 acting upon the movable barrier 11. By sensing each force for each zone, a corresponding force threshold can be determined that better corresponds to each zone of movement. Also, separate force thresholds can be determined for each zone to accommodate movement of the movable barrier 11 in both directions of movement (in the case of a typical garage door, these directions of movement being up and down).

Referring again to FIG. 2, many control systems such as these also optionally determine 24, during a learning mode 20, one or more stop limits (that is, movable barrier positions that correspond to an open position and a closed position) that can be subsequently used to inform and facilitate the process of stopping the movable barrier 11 when moving the movable barrier to a desired position. Such stop limits, then, also constitute an example of an automatically determined performance limit that can benefit from the invention.

So configured, in addition to such other calibration events as may be supported during a learning mode of operation, such a control system 10 will automatically empirically determine one or more force thresholds to be used during normal operation of the corresponding movable barrier 11. As will be shown below, such force thresholds are typically used to ensure that sufficient force is available to move the movable barrier to a desired position, while simultaneously ensuring that movement of the movable barrier 11 will be reversed in the event that the movable barrier 11 comes into contact with an obstacle (such as a person or item of personal property) during movement to a desired position. As noted earlier, these automatically determined force thresholds may, or may not, be appropriate and effective when initially determined. Regardless, over time, physical conditions as impact upon movement of the movable barrier 11 will virtually ensure that these initially determined force thresholds become, permanently or temporarily, inappropriate. When inappropriate, this can result in either incomplete movement of the movable barrier 11 to a desired position and/or in an unsafe operational potential to not reverse when the movable barrier 11 impacts an object.

Figure 4:
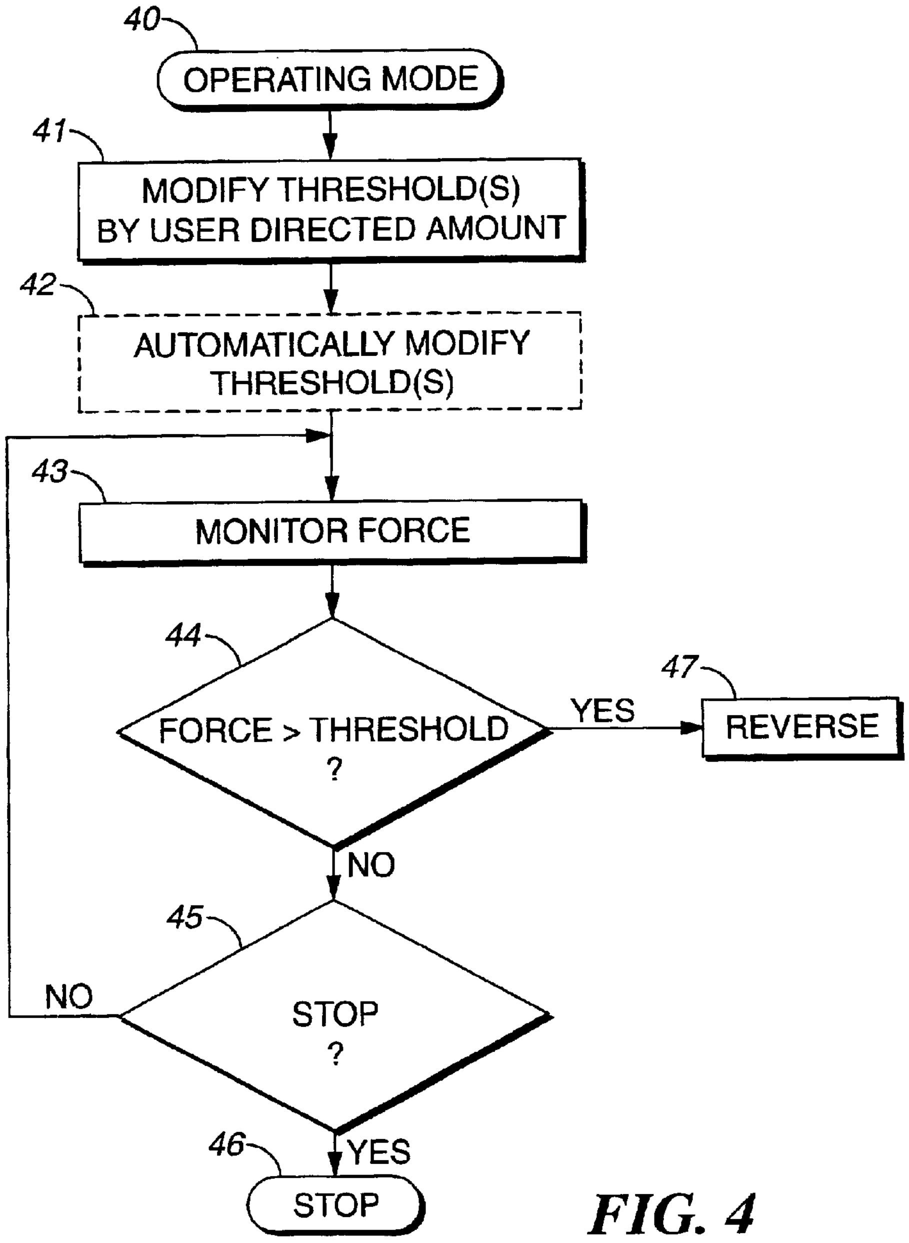
FIG. 4 comprises a flow diagram of operating mode embodiments configured in accordance with the invention.

Referring now to FIG. 4, an operating mode 40 for such a barrier movement control unit 15 can beneficially include the following embodiments. The thresholds (both force thresholds and stop limits, if desired) as automatically determined during the learning mode 20 are modified 41 by a user directed amount. This modification can occur immediately after the thresholds are initially determined during the learning process or anytime thereafter. Similarly, the modified threshold value(s) can be determined once, stored, and used thereafter during the operating mode 40 or calculated anew (using the previously automatically determined values and the present settings of the user interface 18 as briefly mentioned above and as described in more detail below) as needed.

Optionally, if desired, these modified thresholds can be automatically modified 42 still further. For example, if correct settings for the thresholds are known to vary in a particular way with respect to some physical parameter, such as temperature, then the adjusted automatically determined threshold can be further modified automatically as a function of that parameter. Such automatic dynamic threshold modifications are known in the art and hence additional detail will not be presented here.

During the operating mode 40 the relevant parameters are monitored 43 (either continuously, from time to time, or in response to whatever other trigger event might be used in a given application). In this exemplary embodiment utilizing a barrier movement control unit 11, forces acting in opposition to the controlled movement of the barrier 11 are monitored 43 (in addition, or in the alternative, stop limits as mentioned above can be monitored). The forces (and/or stop limit indicia) as monitored are compared 44 against the relevant threshold(s) to determine if the threshold has been exceeded. If not, movement of the barrier 11 continues until eventually stop conditions are satisfied 45 and the barrier 11 comes to a controlled stop 46. When a monitored force level does exceed 44 the adjusted force threshold level, however, movement of the barrier 11 is reversed 47 since this condition likely indicates that an obstacle exists in the pathway of the movable barrier 11.

As noted above, multiple force thresholds can be used in conjunction with multiple corresponding zones of movement for the movable barrier 11. In such a system, as the opposing force is monitored 43, the threshold value that is compared 44 against the monitored force will change from zone to zone. Again, as is the case with a single threshold value, these original automatically determined threshold values are all post-determination adjustable by a user using the user control 18.

Figure 5:
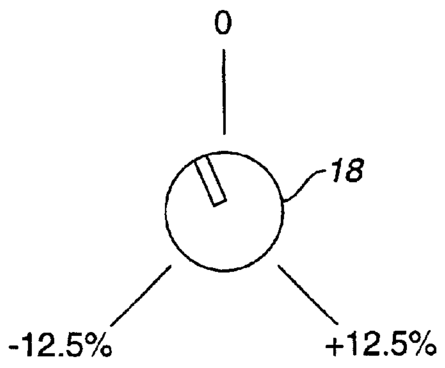
FIG. 5 comprises a detail view of a user interface that illustrates a range of control.

Notwithstanding the fact that automatically determined threshold values of various kinds are often not optimally determined (either initially or over time due to changing circumstances), such automatically determined values are usually nevertheless relatively accurate. Modifying such values greatly can potentially jeopardize effective and/or safe operation of the controlled device or object. Therefore, pursuant to one embodiment, the range of adjustment as provided to the user via the user control 18 is limited. For example, with reference to FIG. 5, the total range of adjustment can be limited to some predetermined value, such as, for example, no more than 25% of the total potential applicable force that is available. In the example depicted, such a range is split equally on either side of a zero setting. With such a limit, a user can increase, or decrease, a force threshold setting by up to 12.5%, but no further. This allows a user to fine tune operation of a given controlled activity while also substantially preventing the user from creating an unsafe or significantly inappropriate setting and corresponding operating condition. Other ratios are possible, of course, including apportioning all of the range to either increases or decreases of the force threshold value.

Figure 6:
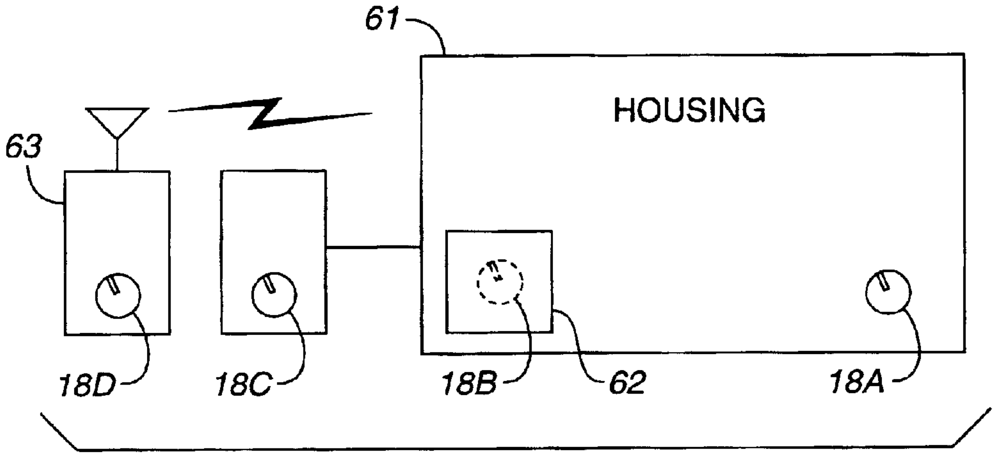
FIG. 6 comprises a block diagram depiction of various embodiments in accordance with the invention.

There are various ways to present such a user interface 18, both to suit differing placement preferences and to accommodate various features and alternatives. For example, referring now to FIG. 6, the barrier movement control unit 15 (and the motor 13 as well, if desired) can be fully or partially disposed within a housing 61. The user manipulable threshold modification control 18 can be a potentiometer or other user mechanism mounted on the housing 61 as indicated at reference numeral 18A, or within the housing 61 as indicated at reference numeral 18B (when located internally, a door 62 can be provided to protect the control 18B from being moved or otherwise readjusted inadvertently). The control unit 18 can also be located in a separate unit as indicated by reference numeral 18C that mounts apart from the housing 61 and that communicates with the barrier movement control unit 15 through, for example, a wired connection. The control unit 18 can also be located in a wireless unit 63 as indicated by reference numeral 18D (such as, for example, a garage door opener remote control unit). In all of these embodiments, regardless of whether the user control unit 18 is positioned proximal or distal to the barrier movement control unit 15, a user can readily adjust already automatically determined thresholds that control or influence the operation of the barrier movement control unit 15.

Figure 7:
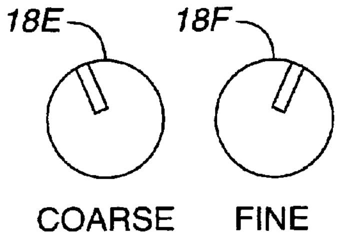
FIG. 7 comprises a detail view of an alternative embodiment of a user interface in accordance with the invention.
Figure 8:
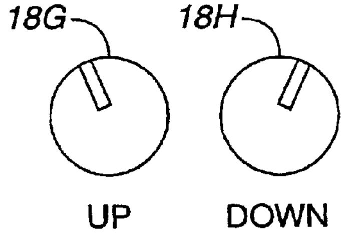
FIG. 8 comprises a detail view of yet another alternative embodiment of a user interface in accordance with the invention.

Those skilled in the art will recognize that a wide variety of modifications, alterations, and combinations can be made with respect to the above described embodiments without departing from the spirit and scope of the invention. For example, with reference to FIG. 7, two such user control units 18E and 18F can be provided. With such a configuration, for example, both course and fine adjustments can be made by the user as described above with respect to the automatically determined threshold values. As another example, and with reference to FIG. 8, separate control units 18G and 18H can be provided to allow individual adjustment of multiple parameters. In the example depicted, one control unit 18G allows user adjustment of a previously automatically determined force threshold for a movable barrier moving upwardly and a second control unit 18H allows user adjustment of a previously automatically determined force threshold for a movable barrier moving downwardly. Such modifications, alterations, and combinations are to be viewed as being within the ambit of the inventive concept.

What is claimed is:

1. An apparatus for use with a movable barrier comprising:

at least one motor operably coupleable to the movable barrier;

a barrier movement control unit operably coupled to the at least one motor, which barrier movement control unit includes:

a processor operably coupled to receive information regarding at least some forces acting upon the movable barrier when the movable barrier is moving and being arranged and configured to automatically determine at least one force threshold during a first mode of operation for use by the barrier movement control unit when controlling the motor in a second mode of operation; and a user manipulable force threshold modification control having an output that provides force threshold modification information for use by the barrier movement control unit when controlling the motor in the second mode of operation.

2. The apparatus of claim 1 wherein the user manipulable force threshold modification control comprises at least one potentiometer.

3. The apparatus of claim 2 wherein the user manipulable force threshold modification control comprises at least two potentiometers.

4. The apparatus of claim 2 and further comprising a housing to at least partially house the at least one motor and the barrier movement control unit.

5. The apparatus of claim 4 wherein the user manipulable force threshold modification control is disposed proximal to the housing.

6. The apparatus of claim 4 wherein a portion of the user manipulable force threshold modification control is disposed distal to the housing.

7. The apparatus of claim 6 wherein a portion of the user manipulable force threshold modification control is disposed proximal to a portable remote control device, which remote control device communicates with the barrier movement control unit.

8. The apparatus of claim 1 wherein the processor is further arranged and configured to automatically determine a plurality of the force thresholds during the first mode of operation.

9. The apparatus of claim 1 wherein the first mode of operation comprises a learning mode of operation.

10. The apparatus of claim 1 wherein the second mode of operation comprises moving the movable barrier from an open position to a closed position.

11. The apparatus of claim 1 wherein the second mode of operation comprises moving the movable barrier from a closed position to an open position.

12. The apparatus of claim 1 wherein the second mode of operation comprises moving the movable barrier from a first position to a second position.

13. The apparatus of claim 12 wherein the second mode of operation includes using the at least one force threshold to determine whether the movable barrier should be moved in a reverse direction.

14. The apparatus of claim 1 wherein the processor includes learning means for sensing the at least some forces acting upon the movable barrier when the movable barrier moves during a learning mode of operation to provide sensed forces information and utilizes at least some of the sensed forces information to determine the at least one force threshold.

15. The apparatus of claim 14 wherein the learning means senses at least one force acting in opposition to controlled movement of the movable barrier.

16. The apparatus of claim 15 wherein the learning means senses the at least one force acting in opposition to controlled movement of the movable barrier a plurality of times during the controlled movement of the movable barrier.

17. The apparatus of claim 1 wherein the user manipulable force threshold modification control is limited such that a range of force threshold modification information as provided at the output of the user manipulable force threshold modification control comprises less than 25 percent of total potential applicable force.

18. The apparatus of claim 1 wherein the processor is further arranged and configured to automatically determine a plurality of force thresholds during the first mode of operation with each of the plurality of force thresholds corresponding to at least partially discrete sections of barrier movement, and wherein the user manipulable force threshold modification control has an output that provides force threshold modification information for use by the barrier movement control unit with at least some of the plurality of force thresholds when controlling the motor in the second mode of operation.

19. A movable barrier control system for use with a barrier that is movable between a first position and a second position, the movable barrier control system comprising:

a motor operably coupleable to the movable barrier;

a sensor having an output that provides data that corresponds to at least some forces acting upon the movable barrier when the movable barrier is moving;

a barrier movement control unit operably coupled to the motor, which barrier movement control unit includes:

a processor operably coupled to the sensor output and being arranged and configured to automatically determine at least one force threshold during a learning operating mode for use by the barrier movement control unit when controlling the motor in a subsequent barrier movement mode of operation; and a user manipulable force threshold modification control having an output that provides force threshold modification information for use by the barrier movement control unit when controlling the motor in the subsequent barrier movement mode of operation, wherein the user manipulable force threshold modification control is limited such that a range of force threshold modification information as provided at the output of the user manipulable force threshold modification control comprises less than 25 percent of total potential applicable force.

20. The movable barrier control system of claim 19 wherein the barrier comprises a garage door.

21. The movable barrier control system of claim 19 wherein the sensor comprises at least one of an optical sensor and a magnetic sensor.

22. A garage door control system for use with a garage door that is movable between a first position and a second position, the garage door control system comprising:

a motor and drive apparatus operably coupleable to the garage door;

sensing means for sensing movement of at least part of the motor and drive apparatus;

user input means for providing force modification information;

control means operably coupled to the motor and drive apparatus, the sensing means, and the user input means for;

in a first mode of operation:

causing the motor and drive apparatus to move the garage door from the first position to the second position;

automatically measuring at least one force acting in opposition to the garage door when the garage door is moving from the first position to the second position to provide measured force information;

automatically using the measured force information to establish at least one maximum force threshold; and in a second mode of operation;

modifying the at least one maximum force threshold in response to the force modification information to provide at least one modified maximum force threshold;

automatically using the at least one modified maximum force threshold when moving the garage door between the first position and the second position.

23. The garage door control system of claim 22 wherein the control means, in the first mode of operation, further automatically measures at least one distance as traversed by the garage door when moving from the first position and the second position to provide measured distance information and uses the measured distance information to establish a stop limit.

24. The garage door control system of claim 23 wherein the control means, in the second mode of operation, further automatically uses the stop limit to stop movement of the garage door when moving the garage door between the first position and the second position.

25. The garage door control system of claim 24 and further comprising second user input means for providing stop limit modification information and wherein the control means, in the second mode of operation, modifies the stop limit in response to the stop limit modification information to provide a modified stop limit and then automatically uses the modified stop limit when moving the garage door between the first position and the second position.

26. The garage door control system of claim 22 wherein the control means will only modify the at least one maximum force threshold in response to the force modification information by an amount that does not exceed 25 percent of the available potential force.

27. A method comprising:

moving a movable barrier from a first position to a second position;

automatically sensing at least one force acting in opposition to movement of the movable barrier when the movable barrier is moving from the first position to the second position to provide sensed force information;

automatically using the sensed force information to determine a maximum force threshold for subsequent use when moving the movable barrier;

sensing user input comprising a maximum force threshold modification;

using the maximum force threshold modification to modify the maximum force threshold for subsequent use in place of the maximum force threshold when moving the movable barrier.

28. The method of claim 27 wherein automatically sensing at least one force acting in opposition to movement of the movable barrier includes automatically sensing at least one force acting in opposition to movement of the movable barrier a plurality of times when the movable barrier is moving from the first position to the second position to provide a plurality of discrete sensed force information items.

29. The method of claim 28 wherein automatically using the sensed force information to determine a maximum force threshold includes automatically using at least some of the plurality of discrete sensed force information items to determine a plurality of maximum force thresholds for subsequent use when moving the movable barrier.

30. The method of claim 29 wherein using the maximum force threshold modification to modify the maximum force threshold includes using the maximum force threshold modification to modify at least one of the plurality of maximum force thresholds for subsequent use in place of the plurality of maximum force thresholds when moving the movable barrier.

31. A method comprising:

moving a movable barrier from a first position to a second position;

automatically sensing at least one force acting in opposition to movement of the movable barrier when the movable barrier is moving from the first position to the second position to provide first sensed force information;

automatically using the first sensed force information to determine a first maximum force threshold for subsequent use when moving the movable barrier to the second position;

sensing first user input comprising a first maximum force threshold modification;

using the first maximum force threshold modification to modify the first maximum force threshold for subsequent use in place of the first maximum force threshold when moving the movable barrier to the second position;

moving a movable barrier from the second position to the first position;

automatically sensing at least one force acting in opposition to movement of the movable barrier when the movable barrier is moving from the second position to the first position to provide second sensed force information;

automatically using the second sensed force information to determine a second maximum force threshold for subsequent use when moving the movable barrier to the first position;

sensing second user input comprising a second maximum force threshold modification;

using the second maximum force threshold modification to modify the second maximum force threshold for subsequent use in place of the second maximum force threshold when moving the movable barrier to the first position.

32. A method comprising:

automatically determining at least one performance limit that corresponds to a particular activity;

providing a post-determination human interface to permit non-automatic adjustment, within a limited range, of the at least one performance limit;

providing an adjusted at least one performance limit in response to a post-determination non-automatic adjustment of the at least one performance limit;

automatically using the adjusted at least one performance limit when facilitating the particular activity.

33. A method for use with movable barrier operators, comprising:

automatically determining at least one performance limit that corresponds to a particular movable barrier operator activity;

providing a post-determination human interface to permit non-automatic adjustment, within a limited range, of the at least one performance limit;

providing an adjusted at least one performance limit in response to a post-determination non-automatic adjustment of the at least one performance limit;

automatically using the adjusted at least one performance limit when facilitating the particular movable barrier operator activity.

34. The method of claim 33 wherein automatically determining at least one performance limit that corresponds to a particular movable barrier operator activity includes automatically determining at least one performance limit that corresponds to a stop limit for a movable barrier.

35. The method of claim 33 wherein automatically determining at least one performance limit that corresponds to a particular movable barrier operator activity includes automatically determining at least one performance limit that corresponds to a force limit for a movable barrier.

* * * * *